(12) United States Patent
Dass et al.

(10) Patent No.: US 9,760,388 B1
(45) Date of Patent: Sep. 12, 2017

(54) MEMORY MONITORING TOOL

(71) Applicant: Amazon Technologies, Inc., Seattle, WA (US)

(72) Inventors: Ramya Dass, Chennai (IN); Rakesh V, Chennai (IN); Prince Bansal, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 14/861,462

(22) Filed: Sep. 22, 2015

(51) Int. Cl.
*G06F 9/45* (2006.01)
*G06F 9/455* (2006.01)

(52) U.S. Cl.
CPC ...... *G06F 9/45533* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

2009/0097501 A1\* 4/2009 Gandal ................. H04L 45/742 370/465
2009/0217006 A1\* 8/2009 Pedersen ............... G06F 11/366 712/214

\* cited by examiner

*Primary Examiner* — Steven Do
(74) *Attorney, Agent, or Firm* — Lee & Hayes, PLLC

(57) ABSTRACT

Described herein are systems for monitoring memory allocation and deallocation associated with compact virtual machine (CVM) instances operating on a host environment. In some cases, the systems output a tree structure that is viewable by a user to understand the native memory usage of the CVM instance stemming from java frames execution. In some particular instances, the tree structure may present to the user a code line by code line analysis of the memory allocation and deallocation.

20 Claims, 10 Drawing Sheets

MEMORY MONITORING TOOL

BACKGROUND

In some programming environments, each application and/or framework may operate as part a single compact virtual machine (CVM) instance. However, when developing software in these environments, the Java machine only provides visibility into memory usage at a per CVM level. Thus, the programmer may be able to determine the amount of memory consumed/reserved for the CVM but not necessarily the amount of memory usage per application operating as part of the CVM. Additionally, the programming environment, in some cases, fails to provide insight into native memory consumption associated with the CVM. The lack of insight into the memory allocation/reservation at an application level often results in over allocation/reservation of memory resources to ensure each application has the necessary resources to perform the desired operations and can often make writing memory efficient code and detecting memory regressions across different software releases difficult. Additionally, detecting and correcting memory leaks may also be difficult.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates a tree structure representative of a stack trace associated with a CVM instance according to some implementations.

DETAILED DESCRIPTION

Figure 1:
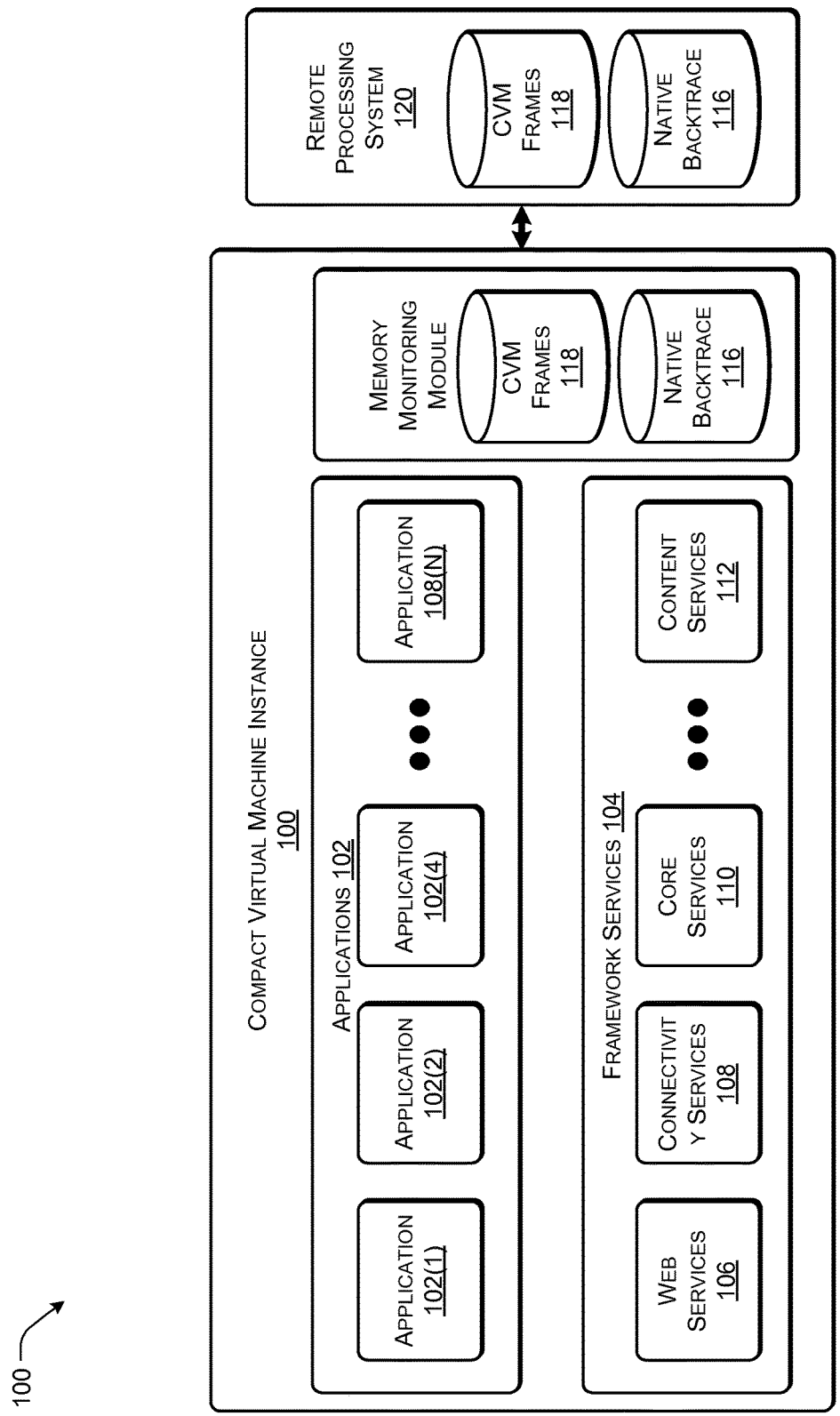
FIG. 1 illustrates an example compact virtual machine (CVM) instance according to some implementations.

This disclosure describes, in part, systems and programming environments to assist a programmer in allocating memory resources to individual applications associated with a compact virtual machine (CVM) instance. For instance, in some platforms, applications and/or framework (e.g., Java or native) may operate as part a single CVM instance. However, on some platforms (such as Java), the platform debugging tools may only provide information related to the overall memory usage/allocation of the CVM instance, not necessarily to the per application/feature usage/allocation within a CVM instance. Additionally, when utilizing a CVM instance it may be difficult for programmers to get native memory insights associated with the CVM instance. In some cases, the lack of insight into the memory usage/allocation at an application/feature level often results in over allocation/reservation of memory resources to ensure each application has the necessary resources to perform the desired operations. Thus, some implementations discussed herein describe a system to provide information related to application level memory resources associated with a CVM instance.

In some particular instances, the CVM instance may be configured to reserve memory resources for individual applications associated with the CVM at the time that the application is enabled. Unfortunately, on some platforms, the CVM instances are configured to reserve the memory allocation until the CVM instance is terminated. Thus, the CVM may request allocation of memory resources associated with the execution of as few as a single line of code and maintain the allocation until the CVM instance is closed. In some cases, if a programmer is able to visualize the per-application/feature memory allocation, the programmer may be able to adopt or alter the single line of code such that the memory allocation is no longer necessary or requested by the CVM instance. In this manner, the CVM instance is prevented from holding memory resources for an extended period of time. For example, the CVM instance may have a total of 5 megabytes (MB) reserved, while utilization is at 3 MB and the additional application may only require 1 MB to execute. In this case, if the programmer had visibility into the per-application memory usage, the programmer may adopt the application code to prevent the CVM instance from requesting an additional MB as the CVM already has sufficient memory resources reserved.

In other particular instances, the one or more lines of code in a particular application associated with a CVM instance, may cause the CVM instance to repeatedly request additional memory resources (e.g., an application that is repeated opened and closed by the CVM instance), thus causing a memory leak as the CVM instance maintains the memory allocation over the entire lifetime of the instance. In some cases, debugging a memory leak associated with multiple application each of which operates as part of the CVM instance, may be difficult when only insight into the CVM instance memory usage/allocation is available. On the other hand, with visibility into the per application memory usage/allocation with code level details holding the memory allocated, the programmer may more easily identify the particular application causing the leak and thereby the particular lines of code causing the memory leak.

In some implementations, the system may be configured to generate a native stack trace associated with the memory allocation and usage of objects executed as part of the CVM instance. For example, the system may monitor the CVM instance and identify events associated with the allocation and/or deallocation of memory. Upon detecting an allocation or deallocation event, the system may obtain and store both a native backtrace associated with the execution of applications on an electronic device hosting the CVM instance and associated CVM frames. The native backtrace may be a log or record of pointers and/or memory address which correspond to function calls and/or operations performed on the host environment of the CVM instance. In some cases, the native backtrace may include pointers to each application operating on the host environment whether or not the application is associated with the CVM instance.

In some instances, CVM frames is utilized to refer to StackFrames of a Java Object associated with a memory allocation (such as a malloc/mmap/calloc operation or any other dynamic allocation) in native code of VM. In one example, the information may be configured to be fetched as part of automated test suite where each test case time event serves as time line event for the processing. The automated test suit may also be configured to run as standalone tool where developer may choose to emit different time lines during analysis. Post the completion of the execution of the test suite/Standalone use case testing by developer in CVM instance, the system may be configured to parse the stored native backtrace and the CVM frames in a remote server or a memory device associated with the environment hosting the CVM instance (for example, a developer's desktop). In some cases, the remote server may be configured to generate a structure representative of the memory allocation by code line over time. For example, the system may generate a tree in which each of the leaf nodes represents a specific line of code obtained from the stored backtrace. The system may associate individual leaf nodes with particular memory allocations obtained from the stored native and CVM frames. In some instances, all the individual leaf nodes may also be associated with a time (e.g., a time representative of a length of time that has passed since the CVM instance was created) at which the line of code was executed and the memory was allocated.

In some examples, the system may also be configured to present the tree structure in various ways to a programmer, such that the programmer may easily identify the native application associated with the CVM instance and/or a line of code holding the memory at given time line (causing a memory leak). In some particular examples, the programmer may be able to view multiple tree structures, each of which associated with the execution of a different instance of the CVM. For instance, the programmer may be able to run multiple test cases associated with a CVM and following the completion of the test cases, view the memory allocation information in parallel to more easily compare and identify differences.

FIG. 1 illustrates an example compact virtual machine (CVM) instance 100 according to some implementations. In some cases, the CVM instance 100 may be a software implementation of a machine (e.g., a computing device) that executes applications, such as applications 102, and frameworks, such as frameworks services 104. The applications 102 may include any number of applications 102(1)-(N). In some cases, the applications 102 may be native applications associated with the host environment and/or applications particular to the CVM. The framework services 104 may include a verity of frameworks or platforms for interfacing the CVM instance 100 with hardware associated with the host device. For example, framework services 104 may include web services 106 (e.g., social network or cloud computing services), connective service 108 (such as a local area (LAN) network), core service 110 (e.g., operation system and BIOS services), content services 112 (e.g., electronic book services), among others.

In some implementations, the CVM instance 100 may be configured to reserve memory resources for individual applications 102 or frameworks 104 operating within the CVM instance 100. Unfortunately, on some platforms, the CVM instance 100 may be configured to reserve the memory allocation until the CVM instance 100 is disbanded. Thus, the CVM instance 100 may request allocation of memory resources associated with the execution of as few as a single line of code of one of the applications 102 or frameworks service 104 and maintain the allocation until the CVM instance 100 is closed. In some cases, if a programmer is able to visualize the per application/feature 102 memory allocation, the programmer may be able to adopt or alter the single line of code such that the memory allocation is no longer necessary or requested by the CVM instance 100, or make thoughtful decisions on low memory situations, thereby preventing the CVM instance 100 from holding memory resources over an extended period of time.

In the illustrated example, a memory allocation monitoring system 114 may be configured to generate a stack trace associated with the memory allocation and usage of code executed as part of the CVM instance 100. For example, the memory allocation monitoring system 114 may monitor the CVM instance 100 and identify events associated with the allocation and/or deallocation of memory resources. Upon detecting an allocation or deallocation event, the system may obtain and provide both a native backtrace 116 associated with the execution of applications 102 and frameworks services 104 and CVM frames 118 to a remote processing system 120.

In other cases, following the termination of the CVM instance 100, in the post processing phase, stored backtrace files 116 and CVM frames 116 in addition to the memory maps (mmaps/smaps) may be fetched from device hosting the CVM instance 100 and remote processing system 120 may be configured to parse the stored native backtrace 116 and the CVM frames 118 (for instance, one frame or line of code at a time) to generate a structure representative of the memory allocation as each line of code is executed. For example, the remote processing system 120 may generate a tree in which each of the leaf nodes represents a specific line of code obtained from the stored backtrace 116. The remote processing system 120 may be associated with individual leaf nodes with particular memory allocations obtained from the stored CVM frames 118. In some instances, the individual leaf nodes may also be associated with a time (e.g., a time representative of a length of time that has passed since the creating of the CVM instance 100) at which the line of code was executed and the memory was allocated, as described in more detail with respect to FIGS. 6-10 below. Additionally, in some examples, it should be understood that the remote processing system 120 may be incorporated into the host environment or even the CVM instance 100.

In some examples, the memory remote processing system 120 may also be configured to present the tree structure in various ways to a programmer such that the programmer may easily identify the application 102 associated with the CVM instance 100 and/or a line of code consuming the memory allocated in given time line. In some particular examples, the programmer may be able to view multiple tree structures, each of which associated with the execution of a different instance of the CVM at different timelines/different or associated with builds. For instance, the programmer may be able to run multiple test cases associated with the CVM instance 100 and following the completion of the test cases, view the memory allocation information in parallel to more easily compare and identify differences.

Figure 2:
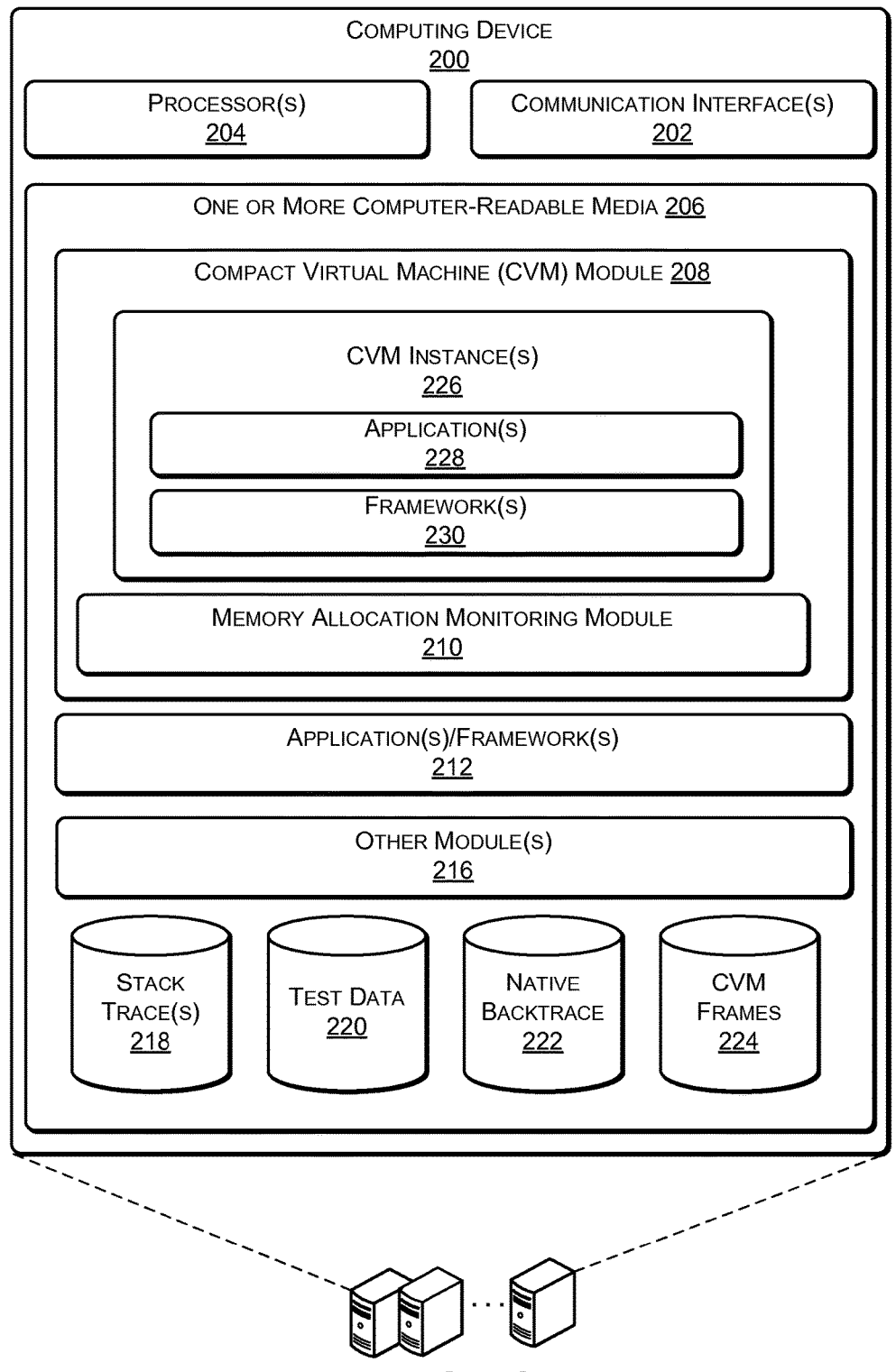
FIG. 2 illustrates an example computing device hosting a CVM instance according to some implementations.

FIG. 2 illustrates an example computing device 200 hosting a CVM instance according to some implementations. Generally, the computing device 200 may be implemented as a standalone device or a networked system that is configured to implement or host a CVM instance, such as CVM instance 100 of FIG. 1. For example, the electronic device 200 may comprise any type of electronic device (e.g., an electronic book reader, a tablet computing device, a laptop computer, a multifunction communication device, a portable digital assistant (PDA), etc.) or non-mobile electronic device (e.g., a desktop computer), a television, specialize streaming device, etc.). In addition, while FIG. 2 illustrates several example components of the electronic device 200, it should be appreciated that the electronic device 200 may also include other conventional components, such as an operating system, system busses, input/output components, and the like.

The electronic device 200 may also include one or more communication interfaces 202 to facilitate communication between one or more networks (such as the Internet or one or more local area networks) and/or directly with one or more devices, such as one or more remote processing systems. The communication interfaces 202 may also facilitate communication between one or more wireless access points, a master device, and/or one or more other computing devices as part of an ad-hoc or home network system. The communication interfaces 202 may support both wired and wireless connection to various networks, such as cellular networks, radio, WiFi networks, short-range or near-field networks (e.g., Bluetooth®), infrared signals, local area networks, wide area networks, the Internet, and so forth. In one particular example, the communication interface 202 may be a wireless communication interface configured to connect to one or more remote systems to stream content to the device 200 or a secondary device coupled to the device 200. In some cases, the communication interface 202 may facilitate communication between the CVM instance and other remote computing systems.

The electronic device 200 also includes one or more processors 204 and computer-readable media 206. Depending on the configuration of the electronic device 200, the computer-readable media 206 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 204.

The computer-readable media 206 may be used to store any number of functional components that are executable on the processors 204, as well as content and applications (such as an operating system). Thus, the computer-readable media 206 may include an operating system and a storage database to store one or more content items, such as eBooks, audio books, songs, videos, still images, and the like. In some particular examples, the computer-readable media 206 of the electronic device 200 may store a CVM module 208 including a memory allocation monitoring module 210 and applications/frameworks 212 (which may run either as part of a CVM instance or as separate processes), in addition to other modules 216 (such as the operating system). The computer-readable media 206 also stores data accessible by the processor 204 to assist with performing operations associated with the modules 208-216. For instance, in the illustrated example, the computer-readable media 206 stores stack traces 218, test data 220, native backtrace 222, and CVM frames 224. In some cases, the stored stack trace files 218 may be provided to and parsed on a server system to organize the data in a manner that may be presented in human readable format as illustrated below with respect to FIGS. 4-10.

In some examples, the CVM module 208 may create a CVM instance 226 on the computing device 200. The CVM instance 226 may be a software implementation of a machine (e.g., a computing device) that executes instances of applications and frameworks 212 as applications 228 and frameworks 230. In some cases, the applications may be native applications associated with the host environment of the electronic device 200 and/or applications particular to the CVM module 208. The framework 230 may include a verity of frameworks or platforms for interfacing the CVM instance 226 with hardware associated with the host device electronic device 200. For example, framework 230 may include Internal services used by application In some implementations, the CVM module 208 may be configured to reserve memory resources for the CVM instance 226 when the CVM instance 226 assesses a particular applications 228 or frameworks 230. Unfortunately, on some platforms, once the CVM instance 226 requests the memory allocation from the computing device 200, the CVM instance 226 may be configured to reserve the memory allocation until the CVM instance 226 is disbanded whether or not the resources are necessary. For example, when a foreground application within the CVM instance 226 is running, background applications/framework services 212 may still be holding memory which might not be necessary. Thus, the CVM module 208 may request allocation of memory resources associated with the execution of as few as a single line of code of one of the applications 228 or frameworks 230 utilized by a CVM instance 226 and the CVM instance 226 may maintain the allocation until the instance is closed.

In some cases, the memory allocation monitoring module 210 may be configured to monitor the allocation and deal-location events associated with each CVM instance 226 operating on the computing device 200 to generate a stack trace 218 particular to the CVM instance 226. In the current example, the memory allocation module 210 is illustrated as a standalone module but the memory allocation module 210 may also be part of the computing device 200 operating system or may run as part of a process that is monitored (such as one of the CVM instances 226). For example, the memory allocation monitoring module 210 may be configured to detect when the memory allocation module 210 requests memory resources from the computing device 200 or releases the memory resources back to the computing device 200. The memory allocation monitoring module 210 may then access the native backtrace 222 associated with the CVM instance 226 to obtain the particular lines of code, code segment, code block, object, and/or native application causing the memory allocation or deallocation. The memory allocation monitoring module 210 may also access the CVM frames 224 associated with the CVM instance 226 to determine the amount and/or type of resources of the particular allocation or deallocation and the timing associated therewith.

In the illustrated example, the CVM module 208 may run as processes, such as a CVM instance 226 on the computing device 200. However, in other examples, other types of daemons such as small purpose daemons or applications configured to perform business functionality (e.g., downloading/logging, etc.) may be monitored by the memory allocation monitoring module 210 in place of the CVM module 208. For example, the memory allocation monitoring module 210 may monitor the memory allocations associated with a webkit based native daemon that runs on the computing device 200. The webkit based native daemon may include daemons to parse and present the memory allocations in the computing device's 200 browser.

Figure 3:
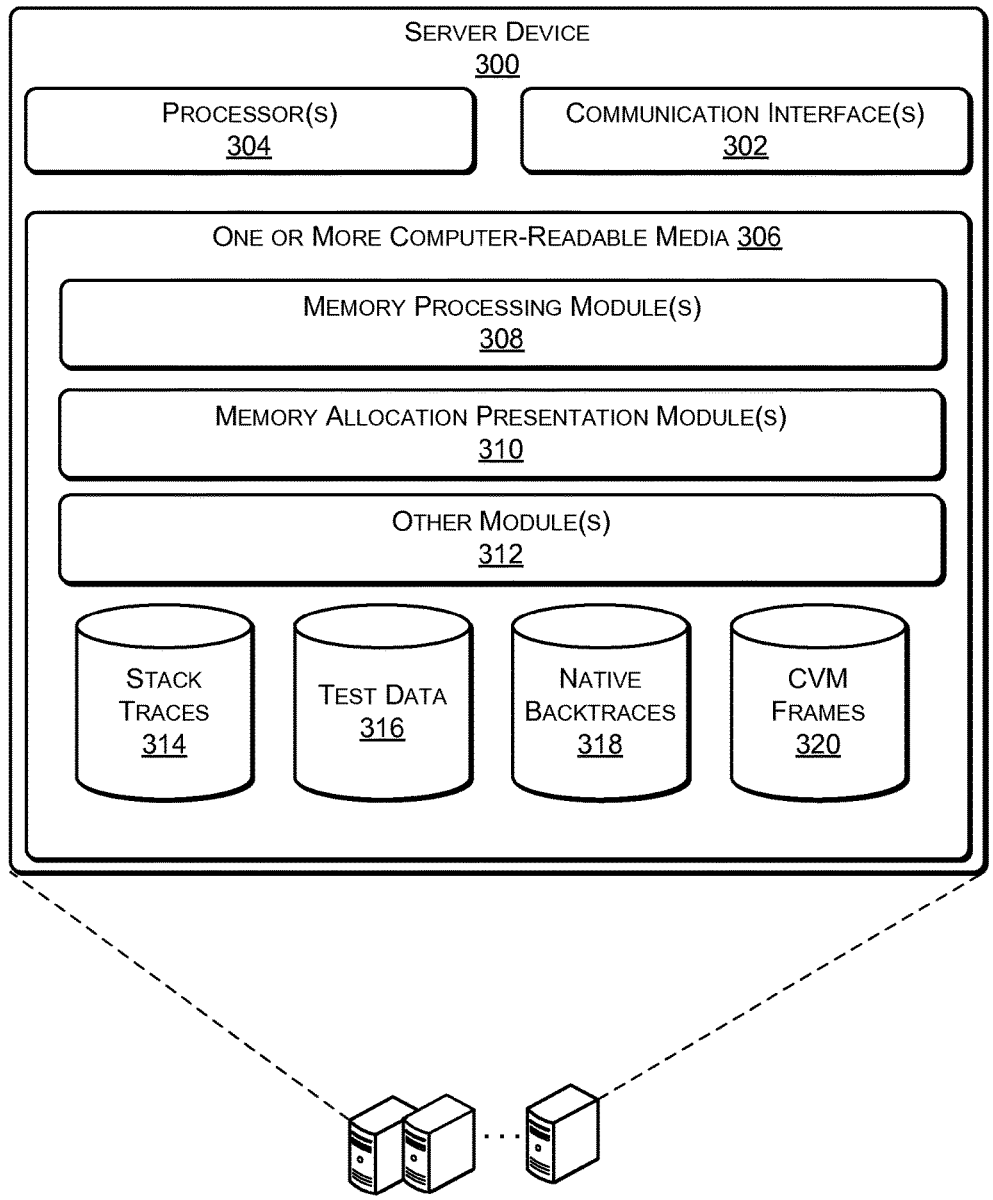
FIG. 3 illustrates an example server device for generating a memory tree according to some implementations.

FIG. 3 illustrates an example server device 300 for generating a memory tree according to some implementations. Generally, the server device 300 may be implemented as a standalone device or a networked system. For example, the server device 300 may comprise any type of electronic device. In addition, while FIG. 3 illustrates several example components of the server device 300, it should be appreciated that the server device 300 may also include other conventional components, such as an operating system, system busses, input/output components, and the like.

The server device 300 may also include one or more communication interfaces 302 to facilitate communication between one or more networks (such as the Internet or one or more local area networks) and/or directly with one or more devices, such as one or more computing devices hosting a CVM instance (such as computing device 200 of FIG. 2). The communication interfaces 302 may also facilitate communication between one or more wireless access points, a master device, and/or one or more other computing devices as part of an ad-hoc or home network system. The communication interfaces 302 may support both wired and wireless connection to various networks, such as cellular networks, radio, WiFi networks, short-range or near-field networks (e.g., Bluetooth®), infrared signals, local area networks, wide area networks, the Internet, and so forth. In one particular example, the communication interface 302 may be a wireless communication interface configured to connect to one or more other or a secondary devices to assist in processing memory data (such as stack traces 314, test data 316, native backtraces 318 and/or CVM frames 320) received from one or more computing devices.

The server device 300 also includes one or more processors 304 and computer-readable media 306. Depending on the configuration of the server device 300, the computer-readable media 306 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 304.

The computer-readable media 306 may be used to store any number of functional components that are executable on the processors 304, as well as content and applications (such as an operating system). Thus, the computer-readable media 306 may include an operating system and a storage database. In some particular examples, the computer-readable media 306 may store a memory processing module 308 and a memory allocation presentation module 310, in addition to other modules 312 (such as the operating system). The computer-readable media 306 also stores data accessible by the processor 304 to assist with performing operations associated with the modules 308-312. For instance, in the illustrated example, the computer-readable media 306 stores the stack traces 312, the test data 316, the native backtraces 318, and the CVM frames 320.

The server device 300 may receive the stack traces 312, the test data 316, the native backtraces 318, and the CVM frames 320 associated with a CVM instance at the communication interfaces 302. For instance, the memory processing module 308 may parse the stored native backtrace 318 and the CVM frames 320 (for instance, one frame or line of code at a time) to generate a structure representative of the memory allocation as each line of code is executed. For example, the memory processing module 308 may generate a tree in which each of the leaf nodes represents a specific line of code obtained from the stored backtrace 318. The memory processing module 308 may associated individual leaf nodes (function names in code) with particular memory allocations obtained from the stored CVM frames 320. In some instances, the individual leaf nodes may also be associated with a time (e.g., a time representative of a length of time that has passed since the creating of the CVM instance) at which the line of code was executed and the memory was allocated.

In some cases, the server device 300 may include the memory allocation presentation module 310 to present the structure generated by the memory processing module 308 in various was to a programmer such that the programmer may easily identify the application and/or frameworks causing a memory allocation when accessed by the CVM instance. In some particular examples, the programmer may be able to view multiple tree structures, each of which associated with the execution of a different instance of the CVM. For instance, the programmer may be able to run multiple test cases using the test data 316 on the CVM instances 226 and following the completion of the test cases, view the stack traces 314 in unison to more easily compare and identify differences. It should be understood that, in some cases, the memory allocation presentation module 310 may also be included as a presentation component of the electronic device 200 of FIG. 2.

Figure 4:
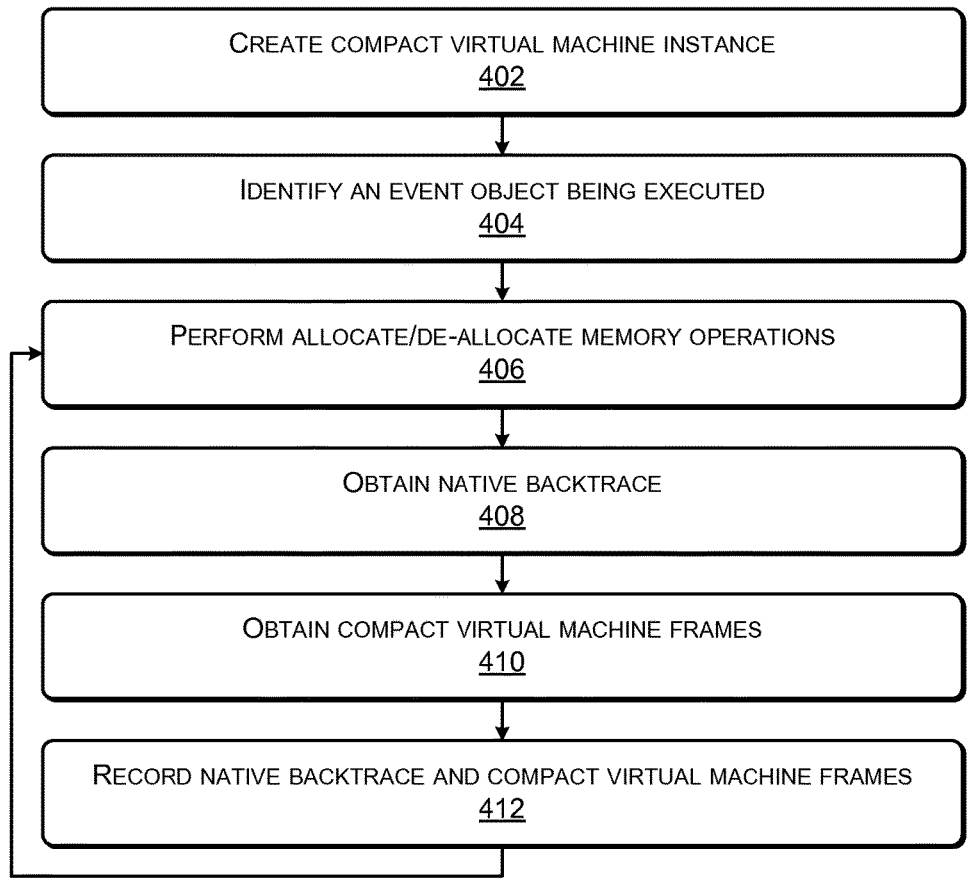
FIG. 4 illustrates an example flow diagram showing an illustrative process for generating a stack trace associated with a CVM instance to some implementations.
Figure 5:
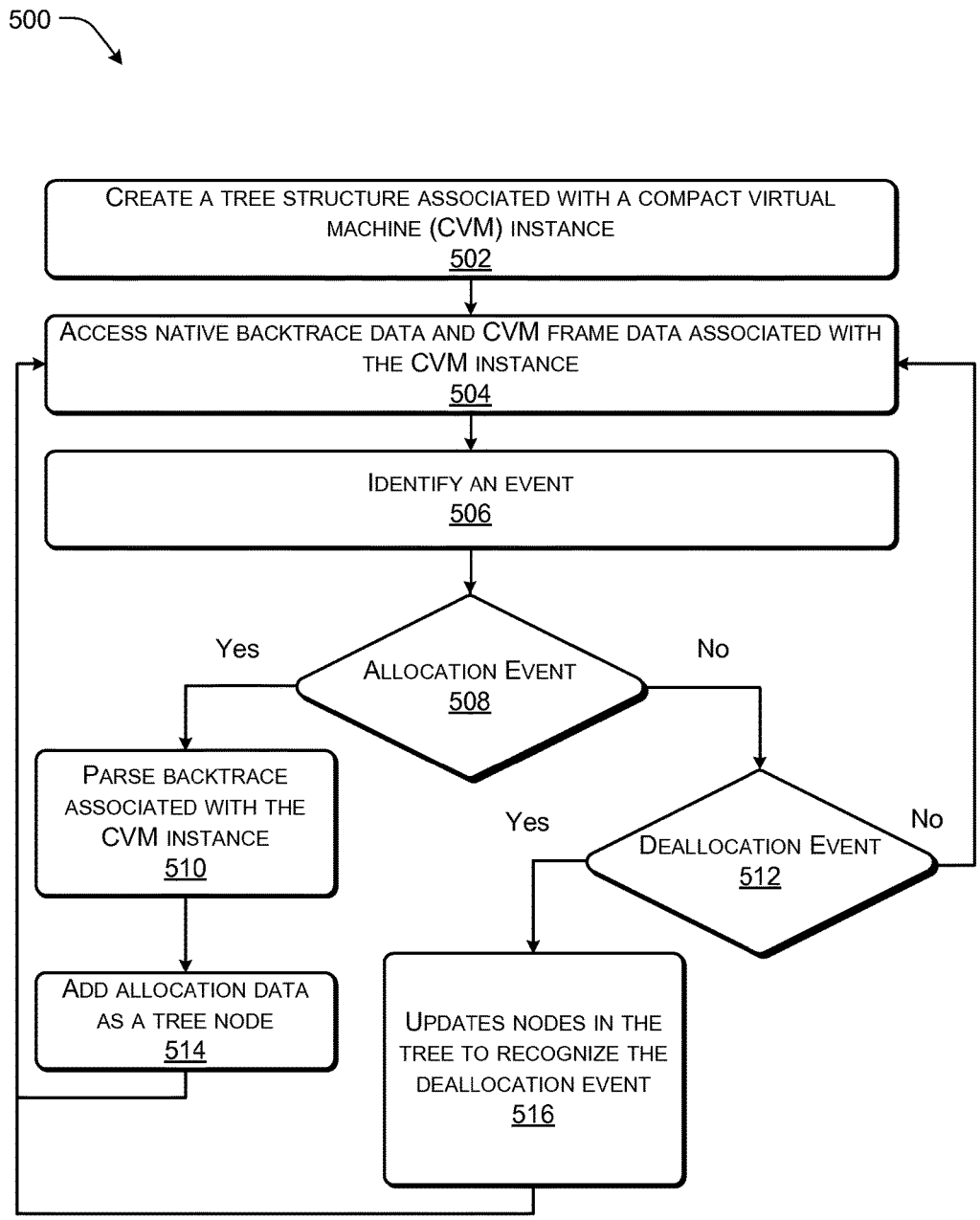
FIG. 5 illustrates an example flow diagram showing an illustrative process for generating a navigable tree structure associated with a stack trace of a CVM instance to some implementations.

FIGS. 4 and 5 are flow diagrams illustrating example processes for creating a structure associated with a stack trace of a CVM instance. The processes are illustrated as a collection of blocks in a logical flow diagram, which represent a sequence of operations, some or all of which can be implemented in hardware, software or a combination thereof.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 4 illustrates an example flow diagram showing an illustrative process 400 for generating a stack trace associated with a test case for a CVM instance to some implementations. On some platforms, the platform debugging tools may only provide information related to the overall memory usage/allocation of the CVM instance, not necessarily to the per application usage/allocation. Additionally, some platforms also fail to provide any insight into native memory allocation/consumption associated with the CVM instance. In these cases, the lack of insight into the memory usage/allocation at an application level often results in over allocation/reservation of memory resources to the CVM instance ensure each application has the necessary resources to perform the desired operations.

In some particular instances, the CVM instance may be configured to reserve memory resources for individual applications associated with the CVM at the time that the application is enabled. Unfortunately, on some platforms, the CVM instances are configured to reserve the memory allocation until the CVM instance is disbanded. Thus, the CVM may request allocation of memory resources associated with the execution of as few as a single line of code and maintain the allocation until the CVM instance is closed. In some cases, if a programmer is able to visualize the per application memory allocation, the programmer may be able to adopt or alter the single line of code such that the memory allocation is no longer necessary or requested by the CVM instance, thereby preventing the CVM instance from holding memory resources over an extended period of time. For example, the CVM instance may have a total of 5 megabytes (MB) reserved, while utilization is at 3 MB and the additional application may only require 1 MB to execute. In this case, if the programmer had visibility into the per application memory usage, the programmer may adopt the application code to prevent the CVM instance from requesting an additional MB as the CVM already has sufficient memory resources reserved.

In other particular instances, the one or more lines of code in a particular application associated with a CVM instance, may cause the CVM instance to repeatedly request additional memory resources (e.g., an application that is repeated opened and closed by the CVM instance), thus causing a memory leak as the CVM instance maintains the memory allocation over the entire lifetime of the instance. In some cases, debugging a memory leak associated with multiple application each of which operates as part of the CVM instance, may be difficult with only insight into the CVM instance memory usage/allocation. On the other hand, with visibility into the per application/feature memory usage/allocation, the programmer may more easily identify the particular application causing the leak and thereby the particular lines of code causing the memory leak. For example, in the illustrated example, the programmer may be executing a single test case. The system may then perform the process 400 for each test case the programmer desires to run.

Thus, process 400 illustrates a process for obtaining and storing information related to the execution of the CVM instance in relation to the memory allocation and deallocation events, such that a stack trace associated with the CVM instance may be generated to assist the programmer in identifying the location of the memory leak and/or any over allocation of resources to the CVM instance. At 402, a CVM instance is created on the host computing environment, such as on computing device 200 of FIG. 2.

In some cases, the process 400 may be performed over and over, such as when a programmer is running multiple test cases on a CVM instance. In these cases, the process 400 may be applied to each of the test cases to collect instance data associated with the test cases such as native backtrace and CVM frames.

At 404, a memory allocation monitoring service may identify an event object being executed. The event object may be associated with the launch of an application or framework or a particular task and include an allocation or deallocation of memory resources to the CVM instance. In some cases, the event may include a request for allocation or deallocation of specific type of memory resources, such as temporary memory resources, hard-drive resources, as well as an amount of resources. For example, the event may be associated with a malloc, mmap, free, delete or other type of memory event.

At 406, the host environment performs the operations associated with the allocation and/or deallocation of the memory resources. For example, the host environment may reserve or allocate random-access-memory (RAM) resources, hard-drive resources, or other memory resources available to the host environment.

At 408, the memory allocation monitoring service obtains a native backtrace associated with the operations performed, for example, by a processor of the host environment. In general, the native backtrace may include a line by line log of the code executed by the computing device associated with the host environment. In one example, the monitoring module interrupts all memory allocation operations (such as malloc, free, mmap, etc.) and identify addresses associated with the operations/function calls which may be stored and later converted to function names. The memory monitoring module may also system level events and/or even names which may be stored with the native backtrace.

At 410, the memory allocation monitoring service obtains a CVM frames associated with the events performed as part of the CVM instance. In general, the CVM frames may include the resources (e.g., amount and type) requests, the time at which the resources where request (for instance, a time relative to the creation of the CVM instance). For example, the CVM instance may operate as a Java instance and the CVM frames may be the Java backtrace which is accessible via the Java API.

At 412, the memory allocation monitoring service may record or store the native backtrace and the CVM frames. For example, the native backtrace and the CVM frames may be temporarily stored in RAM or other temporary memory associated with the computing device of the host environment. Following the completion of 412, the process 400 returns to 406 and the host environment performs the operations associated with the allocation and/or deallocation of the memory resources. The process 400 may continue to cycle until the CVM instance is terminated, for example, via a user interaction or via a particular event.

FIG. 5 illustrates an example flow diagram showing an illustrative process 500 for generating a navigable tree structure associated with a stack trace of a CVM instance to some implementations. As described above, on some platforms, the platform debugging tools may only provide information related to the overall memory usage/allocation of the CVM instance, not necessarily to the per application usage/allocation. In some cases, a stack trace of the memory allocation associated with a CVM instance may be obtained by monitoring the memory allocation events via the environments native back trace and the CVM instances machine frames, as described above with respect to FIG. 4. In some cases, pattern classification may be utilized in post processing to classify memory consumption per application.

In the illustrated example a memory interpretation or processing module may be configured to parse the CVM instance stack trace, the native backtrace, and/or the CVM frames to generate a structure representative of the memory allocation by code line or event over time. For example, the memory allocation monitoring service may generate a tree in which each of the leaf nodes represents a specific line of code obtained from the stored backtrace. The memory allocation monitoring service may associated individual leaf nodes with particular memory allocations events obtained from the stored CVM frames. In some instances, the individual leaf nodes may also be associated with a time (e.g., a time representative of a length of time that has passed since creating the CVM instance) at which the line of code was executed and the memory allocation request was issued.

In some examples, the memory allocation monitoring service may also be configured to present the tree structure in various ways to a programmer such that the programmer may easily identify the native application and/or a line of code holding memory at that instance or causing memory leak over a time line. In some particular examples, the programmer may be able to view multiple tree structures, each of which associated with the execution of a different instance of the CVM. For instance, the programmer may be able to run multiple test cases associated with a CVM and following the completion of the test cases, view the memory allocation information in parallel to more easily compare and identify differences.

At 502, the memory all memory interpretation or processing module creates an empty tree structure associated with the CVM instance. For example, the memory allocation monitoring service may generate a first root node of the tree representative of a particular CVM instance, as described above with respect to FIG. 3.

At 504, the memory interpretation or processing module access the native backtrace data and the CVM frame data associated with the CVM instance. For example, the native backtrace data and the CVM frame data may be stored and associated with the CVM instance by the memory allocation monitoring service as the CVM instance processes commands and executes applications in the device. In some cases, the CVM backtrace data and the CVM frame data may be stored in a temporary memory (e.g., a RAM memory) accessible to the memory interpretation module from the device until the tree structure is fully generated.

At 506, the memory interpretation or processing module identify an event associated with the CVM frames. For example, the memory allocation monitoring service may be configured to parse the CVM frames one frame from the creation of the CVM instance until the CVM instance is terminated. In other examples, the memory interpretation or processing module may process events associated with a single test case or a portion of the CVM time line.

At 508, the memory interpretation or processing module determines if the event is an allocation event. For example, the memory allocation monitoring service may determine if the event is associated with a line of code that causes the CVM instance to request a memory allocation. If the event is associated with an allocation event, the process 500 proceeds to 510. Otherwise, if the event is not associated with an allocation event the process 500 proceeds to 512.

At 510, the memory interpretation or processing module parses the backtrace associated with the CVM instance and classifies the events per application according to the configuration file. For example, the memory interpretation or processing module may use package patterns to classify memory allocations per application/framework/feature At 514, the memory interpretation or processing module adds the allocation data (e.g., the data identified as part of the CVM frame and the backtrace) as leaf node to the tree structure. For example, the memory allocation monitoring service may add a leaf node including the line of code, application or framework, amount and type of resources allocated to the CVM instance, and the time or frame at which the allocation occurred to the leaf node. In some cases, the memory allocation monitoring service may add the application or framework as an intermediate node in the tree structure in addition to adding the line of code as a leaf node to further assist a programmer in debugging the CVM instance. In some examples, the memory interpretation or processing module, constructs a butterfly view for allocations from CVM instance for given time frame. In some cases, the butterfly view show functions which extracted low level leaf nodes to illustrate top level calls in the stack trace that resulted in the memory allocation event. In this manner, it may be easier for an end-user or programmer to visualize the functions that lead the memory allocations operations. Returning to 512, the memory interpretation or processing module determines if the event is a deallocation event. For example, the memory allocation monitoring service may determine if the event is associated with a line of code that causes the CVM instance to release memory resources currently reserved by the CVM instance. If the event is associated with a deallocation event, the process 500 proceeds to 516. Otherwise, if the event is not associated with an allocation event the process 500 proceeds to 504 and the memory allocation interpretation module in post processing phase access the CVM frames and backtrace to identify the next event.

At 516, the memory interpretation or processing module updates nodes in the tree to recognize the deallocation events. For example, each node includes a pointers representative of the allocation/deallocation. On deallocation, the memory interpretation module may compare the pointers of each of the nodes in the tree to identify the node that contains an allocation pointer matching the deallocation pointer. If allocation pointer matches the deallocation pointer, that node is updated with deallocation information (e.g., an amount of freed memory space) and the time line may be updated to show when the memory space was freed.

The process 500 may continue until each event associated with the CVM instance is analyzed to determine if the event is an allocation event or a deallocation event. Once each event has been processed the tree structure is complete and the process 500 may terminate.

Figure 6:
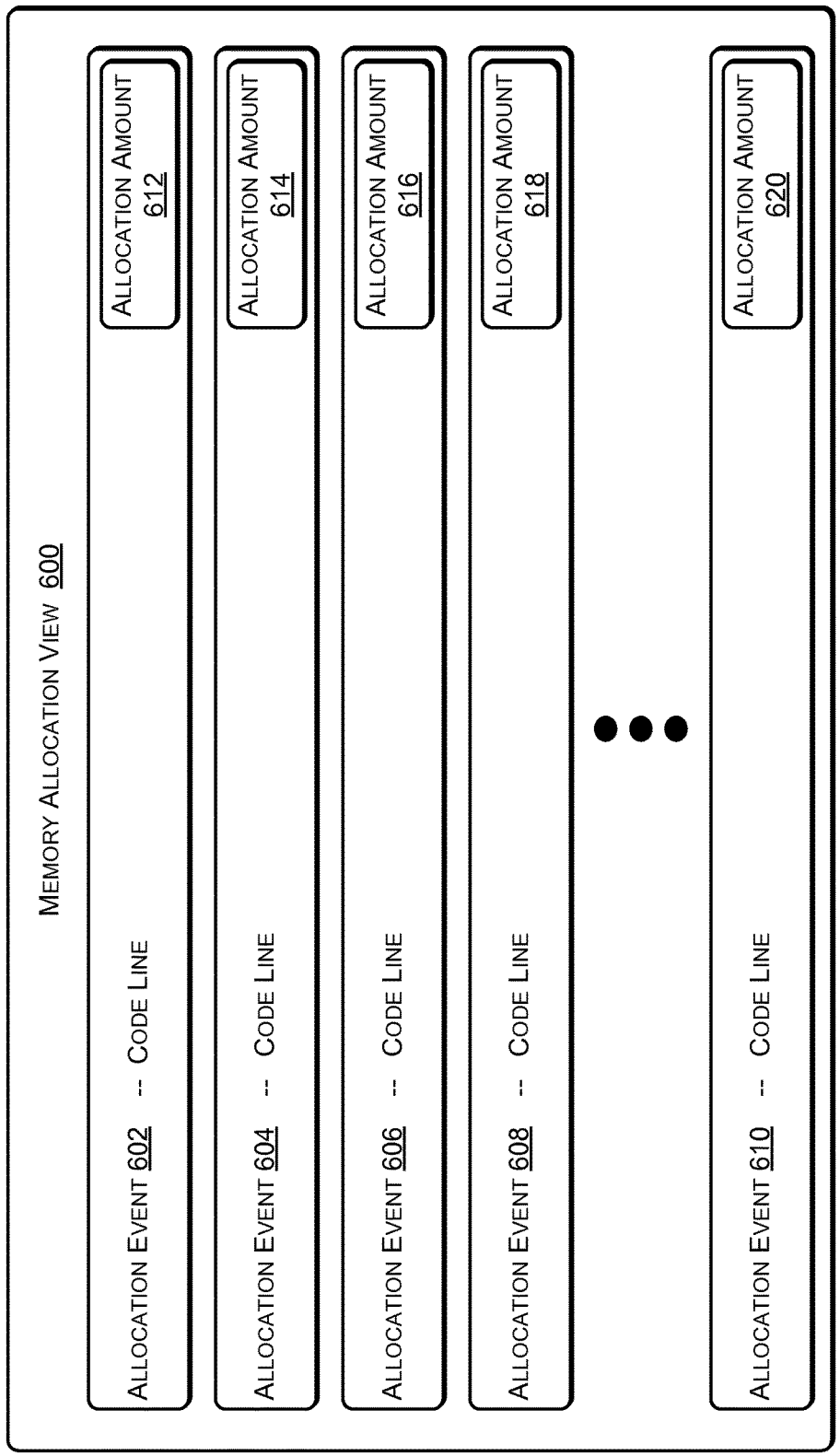
FIG. 6 illustrates an example memory allocation view of a tree structure representative of the backtrace associated with memory allocations from a CVM instance according to some implementations.

FIG. 6 illustrates an example memory allocation view 600 of a tree structure representative of the memory allocations associated with a CVM instance according to some implementations. As described above, the memory interpretation module in post processing phase may be configured to parse through the CVM frames one or more frames at a time to identify different application/features that contributed to memory allocations.

In the illustrated example, the memory allocation view 600 includes multiple allocation nodes (or functions) 602-610 entries. Each of the entries is show as a separate line within the memory allocation view 600 window. In the illustrated example, each allocation node 602-610 may be ordered chronologically with the allocation node 602 occurring first and the allocation node 610 occurring last. However, it should be understood that the allocation node 602-610 may be ordered using various other known criteria. All the information can be represented for a given timeline. Timeline being the test case or an event developer has chosen to associate with the timeline.

In the illustrated example, each of the allocation event 602-610 entries also includes data associated with the event, function name with line number (and/or code line), that may be used to identify the particular code segment or line that initiated the memory allocation. Each of the nodes 602-610 also include a corresponding allocation amount 612-620 listing the amount of resources reserved when the code segment was executed. In some cases, each allocation event 602-610 may also include an indication of the type of resources allocated and/or an indication of any resources released during the life span of the CVM instance.

Figure 7:
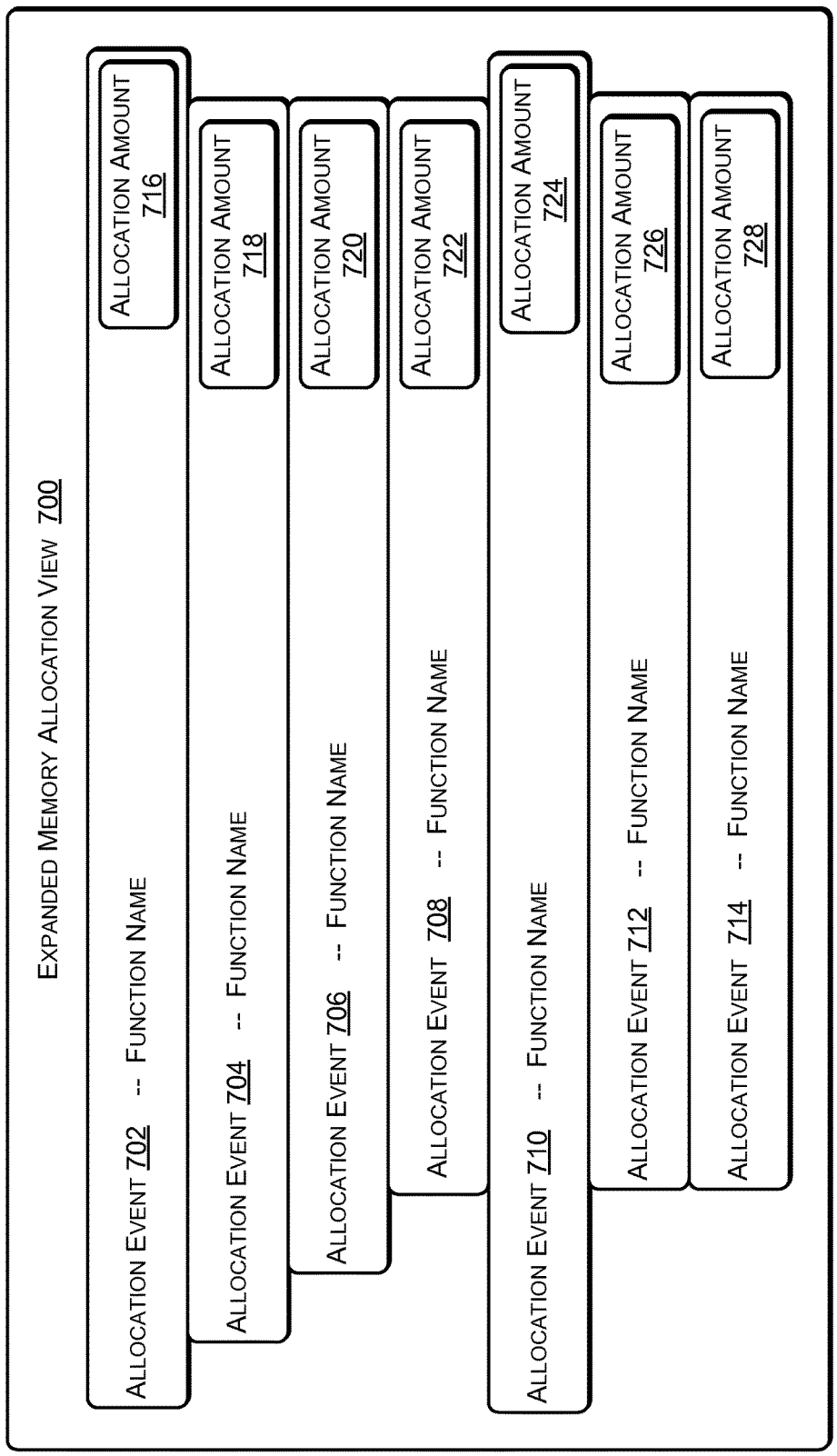
FIG. 7 illustrates an example expanded memory allocation view of a tree structure representative of the memory allocations associated with a CVM instance according to some implementations.

FIG. 7 illustrates an example expanded memory allocation view 700 of a tree structure representative of the memory allocations associated with a CVM instance according to some implementations. In some cases, a programmer may desire to view the stacktrace of code, or even the particular line of code associated with a memory allocation. In these cases, the memory allocation monitoring service may provide the expanded memory allocation view 700 to allow the programmer to view different levels of detail associated with the code being executed as part of a CVM instance.

In the illustrated example, the expanded memory allocation view 700 includes multiple nodes 702-714 each corresponding to different parts of an application or framework executing on the CVM instance. For example, the notes 702 and 710 may corresponding to the executing of an object. The nodes 704 may corresponding to the executing of a class. The node 706 may corresponding to the executing of a code segment. The nodes 708, 712, 714 may corresponding to the executing of an individual code line.

Each of the node 702-714 entries also includes data associated with the event, function name with code line that may be used to identify the particular portion of code that initiated the memory allocation event. Each of the nodes 702-714 also include a corresponding allocation amount 716-728 listing the amount of resources reserved when the code segment was executed. In some cases, each node 702-714 may also include an indication of the type of resources allocated and/or an indication of any resources released during the lifespan of the CVM instance.

In general, each of the entries is show as a separate line within the expanded memory allocation view 700 window. In the illustrated example, the nodes 702 and 710 may be ordered chronologically with the allocation nodes 704-708 providing an additional breakdown of the memory allocation associated with the object of node 702 and the nodes 712 and 714 providing an additional breakdown of the memory allocation associated with the object of allocation event 710. In some cases, the various levels of abstraction may be minimized or expanded at the desire of the programmer viewing the expanded memory allocation view 700.

Figure 8:
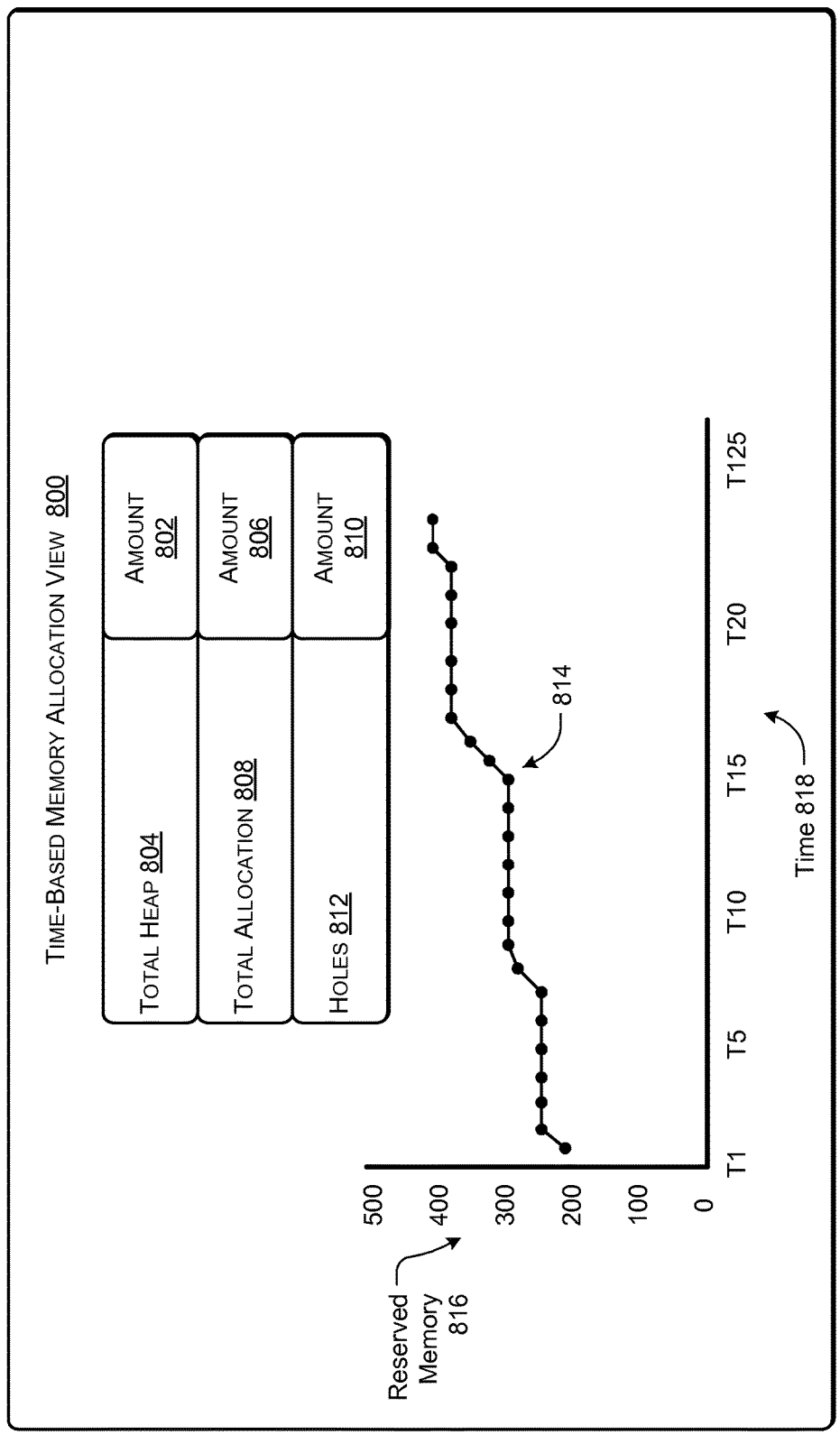
FIG. 8 illustrates an example time-based memory allocation view of a tree structure representative of the memory allocations associated with a CVM instance according to some implementations.

FIG. 8 illustrates an example time-based memory allocation view 800 of a tree structure representative of the memory allocations associated with a CVM instance according to some implementations. In general, the time-based memory allocation view 800 provides the programmer with picture of an amount of resources 802 associate with the total heap 804, the amount of resources 806 memory held by the CVM instance 808 after completing all events. Additionally, the time-based memory allocation view 800 may allow the programmer to visualize the amount of resources 810 associated with any holes 812 or memory holes created due to fragmentations of the memory resources.

In the illustrated example, the time-based memory allocation view 800 provides a graph 814 illustrating the amount of memory resources reserved 816 by the CVM instance over time 818 (such as frame by frame). Thus, in some cases, the programmer may be able to identify the time or frame at which the CVM instance's reserved amount 816 increased. The programmer may then access the memory allocation views of FIGS. 5 and 6 to identify the particular code segment or line causing an issue.

Figure 9:
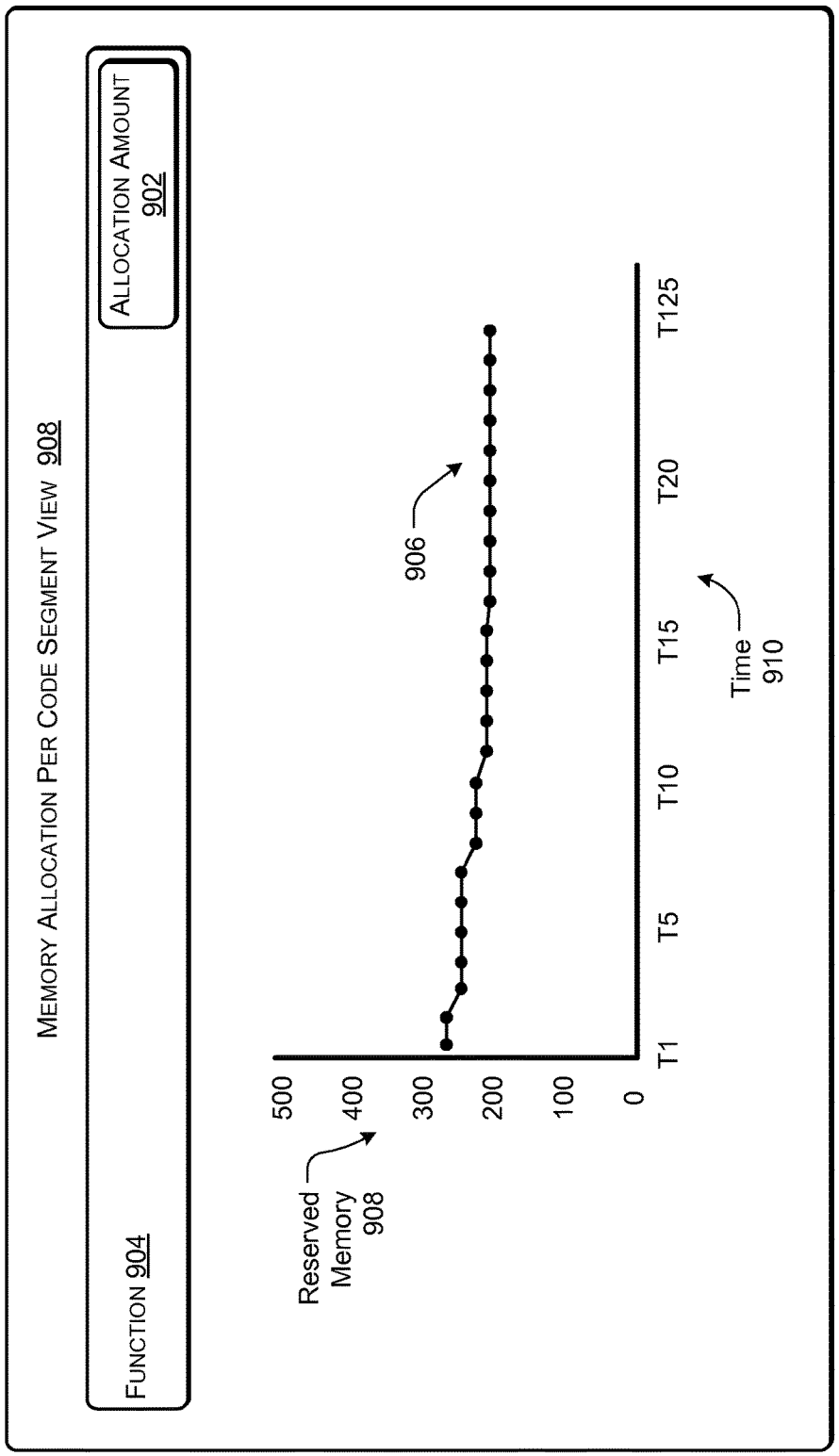
FIG. 9 illustrates example time-based memory allocation view of a function contributing to the memory allocations associated with a CVM instance according to some implementations.

FIG. 9 illustrates another example time-based memory allocation view 900 of a tree structure representative of the memory allocations associated with a CVM instance according to some implementations. In general, the time-based memory allocation view 900 provides the programmer with an indication of the amount of resources 902 that a particular function 904 utilizes over the lifetime of the CVM instance. The time-based memory allocation view 900 may represent both the memory allocation events and the memory deallocation events associated with the function 904, such that the programmer may be able to identify when the memory resources are reserved and when the memory resources are freed by the function 904.

In the illustrated example, the time-based memory allocation view 900 provides a graph 906 illustrating the amount of memory resources reserved 902 by the function 904 over time 910 (such as frame by frame). Thus, in some cases, the programmer may be able to identify if the CVM instance ever frees the resources requested by the function 904.

Figure 10:
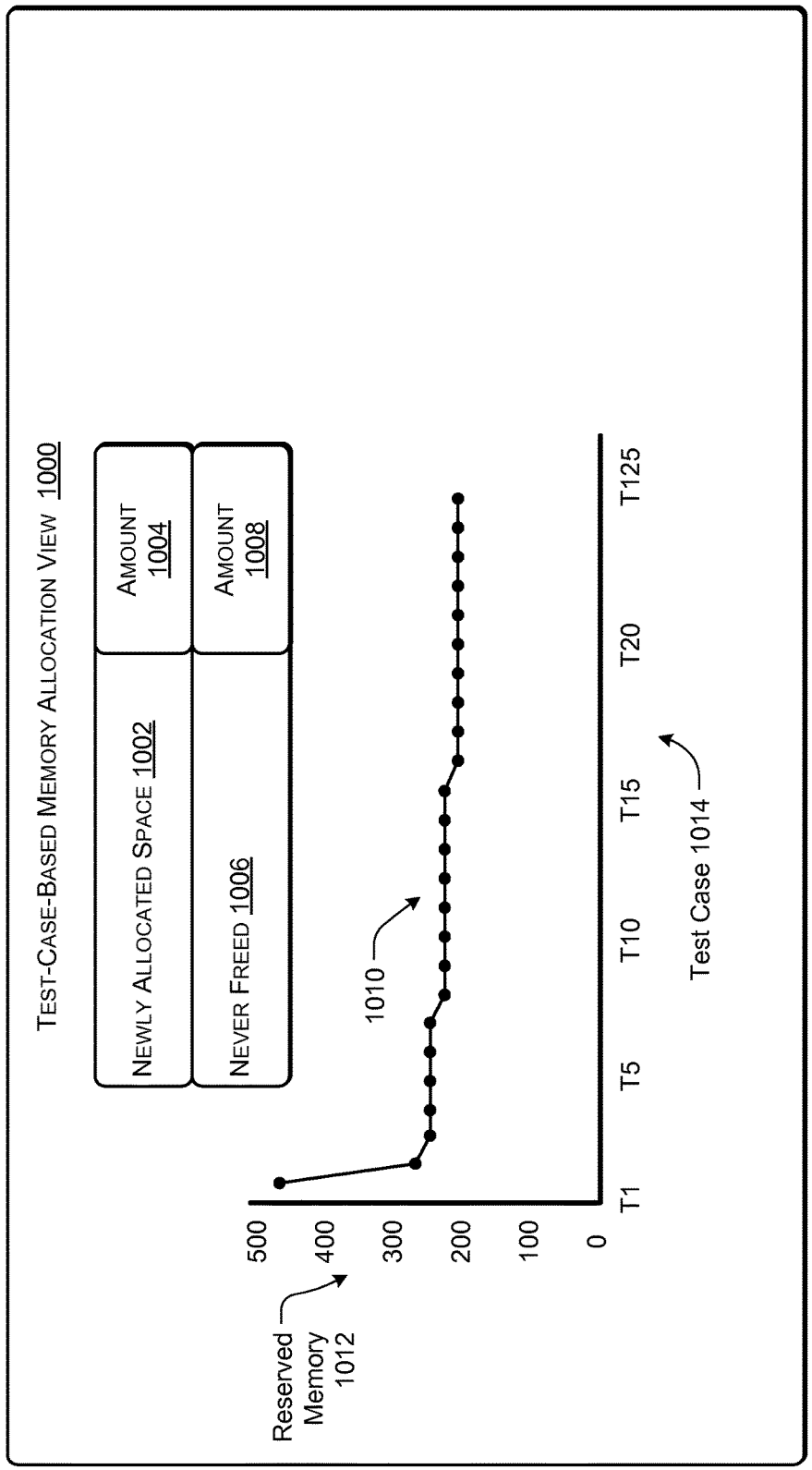
FIG. 10 illustrates an example test-case-based memory allocation view of a tree structure representative of the memory allocations associated with a CVM instance according to some implementations.

FIG. 10 illustrates an example test-case-based memory allocation view 1000 of a tree structure representative of the memory allocations associated with a CVM instance according to some implementations. In general, the test-case-based memory allocation view 1000 provides the programmer with the ability to track the trend and amount of memory that is never freed by a CVM instance over multiple test cases. In the illustrated example, the test-case-based memory allocation view 1000 presents the programmer with the newly allocated space 1002 and the amount 1004, as well as the always reserved space 1006 and the amount 1008.

In the illustrated example, the test-case-based memory allocation view 1000 also provides a graph 1010 illustrating the amount of memory resources that is never freed 1012 by the CVM instance over each test case 1016. Thus, in the illustrated example, the amount of memory never freed for the CVM instance declines over the test cases, as the programmer may be able to identify memory holes and memory leaks as each test case is performed. Thus, by utilizing the test-case-based memory allocation view 1000, the programmer is able to determine if an edit to the application or framework code reduced the memory allocation of the CVM instance.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
performing, via a compact virtual machine (CVM) instance, a plurality of operations associated with an application;
monitoring the plurality of operations associated with the application associated with the CVM instance;

for an operation of the plurality of operations, storing a pointer determined from a native backtrace associated with the application and a function name and time determined from one or more CVM frames associated with the CVM instance;

based at least in part on a termination of the CVM instance, determining that the operation is an allocation operation;

identifying an amount of memory resources associated with the operation based at least in part on the pointer;

inserting a value representative of the amount of memory resources, a value representative of the time, and the function name as a node into a tree structure, the tree structure representing memory allocated to the application associated with the CVM instances;

providing the tree structure for presentation on a graphical user display, wherein individual nodes of a plurality of nodes of the tree structure represent a test case of the CVM instance for comparing relative amounts of memory resource usage;

receiving an edit to code associated with the application to reduce the memory allocated to the application associated with the CVM instance; and applying the edit to the code.

2. The method as recited in claim 1, wherein the node is a leaf node.

3. The method as recited in claim 1, further comprising:
performing the plurality of operations associated with the application associated with the CVM instance via a first one or more processors; and
monitoring the operation of the plurality of operations via a second one or more processors remote from the first one or more processors.

4. The method as recited in claim 1, further comprising:
determining, based at least in part on the native backtrace, a code segment associated with the application; and
associating the code segment with the node.

5. A method comprising:
receiving a native backtrace and one or more compact virtual machine (CVM) frames associated with a CVM instance;
parsing the native backtrace and the one or more CVM frames to identify a code segment and an amount of resources allocated to the CVM instance;
inserting the code segment and a value representative of the amount of resources as a first memory allocation event in a tree structure, the tree structure representing memory allocated to an application associated with the CVM instance;
providing the tree structure for display on a graphical user interface, wherein the tree structure includes a plurality of expandable nodes for viewing the first memory allocation event of a plurality of memory allocation events;
receiving an edit to at least a portion of the code segment associated with the application to reduce the memory allocated to the application associated with the CVM instance; and
applying the edit to the at least the portion of the code segment.

6. The method as recited in claim 5, further comprising:
identifying a time associated with an operation of the CVM instance based at least in part on the one or more CVM frames; and
inserting a representation of the time as part of the first memory allocation event in the tree structure.

7. The method as recited in claim 5, further comprising associating the code segment with the first memory allocation event.

8. The method as recited in claim 5, further comprising:
parsing the native backtrace and the one or more CVM frames to identify a pointer associated with the resources allocated to the CVM instance as part of an operation; and
inserting the pointer into the tree structure as part of the first memory allocation event.

9. The method as recited in claim 8, wherein the pointer is a first pointer, the method further comprising:
identifying a second operation associated with the CVM instance;
parsing the native backtrace and the one or more CVM frames to identify a second pointer associated with the second operation;
matching the second pointer to the first pointer associated with the first memory allocation event in the tree structure; and
marking the first memory allocation event as freed.

10. The method as recited in claim 5, wherein the code segment is a particular line of code associated with requesting the resources allocated to the CVM instance.

11. The method as recited in claim 5, wherein the native backtrace is a first native backtrace, the method further comprising:
identifying an operation associated with a native application accessed via the CVM instance;
storing a second native backtrace associated with the native application; and
storing the one or more CVM frames associated with the CVM instance.

12. The method as recited in claim 5, wherein the native backtrace and the one or more CVM frames are received from a remote device via one or more communication interfaces.

13. The method as recited in claim 5, further comprising hosting the CVM instance via one or more processors.

14. A method comprising:
parsing one or more frames associated with a compact virtual machine (CVM) instance to identify a first allocation event;
parsing a native backtrace associated with one or more applications executing in an environment hosting the CVM instance to identify an amount of memory resources associated with the first allocation event;
generating a node in a structure, the node including a value representative of the amount of memory resources and the structure representative of memory allocation associated with the CVM instance;
presenting the structure for display in a graphical user interface, the node one of a plurality of nodes, the plurality of nodes representing a plurality of test cases associated with the CVM instance;
receiving an edit to code associated with at least one of the one or more applications to reduce the memory allocation associated with the CVM instance; and
applying the edit to the code.

15. The method as recited in claim 14, further comprising:
receiving a request from an application of the one or more applications;
allocating memory resources to the CVM instance based on the request;
obtaining the native backtrace associated with the application;

obtaining one or more CVM frames associated with the CVM instance;

storing the native backtrace and the one or more CVM frames; and terminating the CVM instance.

16. The method as recited in claim 14, further comprising:

identifying a pointer to a memory address associated with the first allocation event; and associating the pointer with the node.

17. The method as recited in claim 14, further comprising:

identifying a first code segment associated with the first allocation event based at least in part on the native backtrace; and associating the first code segment with the node.

18. The method as recited in claim 14, further comprising receiving the one or more frames and the native backtrace at a communication interface of a post processing system remote from the environment hosting the CVM instance.

19. The method as recited in claim 18, wherein the node includes a function name corresponding to the first allocation event.

20. The method as recited in claim 14, further comprising:

identifying a function name associated with the first allocation event based at least in part on parsing the native backtrace and the one or more frames; and associating the function name with the node.

* * * * *